United States Patent
Kegler

(10) Patent No.: US 9,726,288 B2
(45) Date of Patent: Aug. 8, 2017

(54) PRESSURE VESSEL CLOSURE

(71) Applicant: Eminent Technologies, LLC, Naperville, IL (US)

(72) Inventor: Andrew Kegler, Naperville, IL (US)

(73) Assignee: EMINENT TECHNOLOGIES, LLC, Naperville, IL (US)

( * ) Notice: Subject to any disclaimer, the term of this patent is extended or adjusted under 35 U.S.C. 154(b) by 0 days.

(21) Appl. No.: 14/697,278

(22) Filed: Apr. 27, 2015

(65) Prior Publication Data
US 2015/0308574 A1 Oct. 29, 2015

Related U.S. Application Data

(60) Provisional application No. 61/986,024, filed on Apr. 29, 2014.

(51) Int. Cl.
| | |
|---|---|
| *F16J 13/18* | (2006.01) |
| *E05B 65/00* | (2006.01) |
| *E05C 19/00* | (2006.01) |
| *F16J 13/08* | (2006.01) |
| *E05C 9/00* | (2006.01) |

(52) U.S. Cl.
CPC ............ *F16J 13/18* (2013.01); *E05B 65/006* (2013.01); *E05C 19/001* (2013.01); *F16J 13/08* (2013.01); *E05C 9/00* (2013.01)

(58) Field of Classification Search
CPC ... F16J 13/16; F16J 13/18; F16J 13/08; E05C 3/002; E05C 3/185; E05C 3/124; E05C 3/145; E05C 19/001; E05C 19/002
USPC ................. 49/316, 317, 318, 319, 320, 321
See application file for complete search history.

(56) References Cited

U.S. PATENT DOCUMENTS

| | | | | |
|---|---|---|---|---|
| 1,796,923 A | * | 3/1931 | Firestone ................ | E05C 3/145 292/336 |
| 1,798,148 A | * | 3/1931 | Ekman .................... | E05C 3/145 292/210 |
| 2,040,024 A | * | 5/1936 | Roberts ................ | B65D 45/345 220/321 |
| 2,575,972 A | * | 11/1951 | Nelson .................... | E05C 3/145 292/238 |

(Continued)

FOREIGN PATENT DOCUMENTS

| | | | | |
|---|---|---|---|---|
| FR | WO 02097319 A1 | * | 12/2002 | ............... F16J 13/08 |
| FR | 2872446 A1 | * | 1/2006 | ............... B01L 1/02 |

*Primary Examiner* — Katherine Mitchell
*Assistant Examiner* — Catherine A Kelly
(74) *Attorney, Agent, or Firm* — Jeffer Mangels; Butler & Mitchell LLP; Brennan C. Swain, Esq.

(57) ABSTRACT

A closure for a pressure vessel that includes a neck with a groove defined in the inner diameter, and a door assembly that pivots between opened and closed positions. The door assembly includes a door portion sized to be received in an opening of the neck, a guide plate connected to the door portion and rotatable between locked and unlocked positions, a first lock ring segment positioned radially outwardly of the guide plate and a handle. The guide plate includes a first cam path defined therein that receives a cam member of a first lug assembly that extends inwardly from the first lock ring segment. Rotation of the handle (and guide plate) from the unlocked to the locked position moves the first lock ring segment from a locked to an unlocked position. In the locked position, the first lock ring segment is received in the groove of the neck.

17 Claims, 5 Drawing Sheets

(56) References Cited

U.S. PATENT DOCUMENTS

| | | | | |
|---|---|---|---|---|
| 3,694,145 A | * | 9/1972 | Stevens | A61L 2/26 |
| | | | | 220/323 |
| 4,294,378 A | * | 10/1981 | Rabinovich | F16J 13/18 |
| | | | | 105/377.07 |
| 4,693,278 A | * | 9/1987 | Wilson | F16L 55/136 |
| | | | | 138/89 |
| 5,782,507 A | * | 7/1998 | Hardee | E05C 1/004 |
| | | | | 292/145 |
| 7,036,674 B2 | * | 5/2006 | McGuire | B01J 3/03 |
| | | | | 220/263 |
| 8,251,238 B2 | * | 8/2012 | Smith | F16J 13/08 |
| | | | | 220/234 |
| 8,342,353 B2 | * | 1/2013 | Bartlett | B63C 11/32 |
| | | | | 128/205.26 |
| 8,596,484 B1 | * | 12/2013 | Haibel | F16J 13/18 |
| | | | | 220/262 |
| 8,984,812 B2 | * | 3/2015 | Karallus | E05B 17/2038 |
| | | | | 114/116 |
| 2013/0025209 A1 | * | 1/2013 | Lidster | F16J 13/08 |
| | | | | 49/359 |
| 2017/0009500 A1 | * | 1/2017 | Do | E05C 3/004 |

* cited by examiner

PRESSURE VESSEL CLOSURE

CROSS REFERENCE TO RELATED APPLICATIONS

This application claims the benefit of U.S. Provisional Application No. 61/986,024, filed Apr. 29, 2014 the entirety of which is incorporated herein by reference in its entirety.

FIELD OF THE INVENTION

The present invention relates generally to a closure for a pressure vessel.

BACKGROUND OF THE INVENTION

A cost effective apparatus used for a closure in a pressure vessel is needed for a variety of applications. In the past, when a guided ring is used on a manually operated vessel closure, there is a possibility that the operator may inadvertently extend the rings with the door in the open position. This action creates a potential for damage to occur if the operator attempts to close the door while the ring segments are extended. The ring segments make contact with the vessel wall external surface which can damage either the ring segments, the vessel wall, or the guide rods.

Closures which require a high level of machining and/or automation to accomplish the safe operation of a pressure vessel have been used frequently in low volume equipment such as dry cleaning using liquid carbon dioxide. The apparatus described herein improves on the previous attempts to accomplish the safe closure of pressure vessels.

SUMMARY OF THE PREFERRED EMBODIMENTS

In accordance with an aspect of the present invention there is provided a closure for a pressure vessel that includes a neck that is adapted to be secured to the pressure vessel and defines a central opening with an inner diameter having a groove defined therein, and a door assembly that pivots with respect to the neck between an open position and a closed position. The door assembly includes a door portion that has an inner surface and an outer surface and is sized to be received in the central opening of the neck, and a guide plate connected to the outer surface of the door portion and rotatable between a locked position and an unlocked position. The guide plate includes at least a first cam path defined therein, and defines a first axis about which the guide plate rotates. The door assembly also includes a first lock ring segment positioned radially outwardly of the guide plate and including a first lug assembly that extends inwardly and has a cam member that is received in the first cam path. Rotation of the guide plate from the unlocked position to the locked position moves the first lock ring segment from a locked position to an unlocked position, and, in the locked position, the first lock ring segment is received in the groove of the neck. The door assembly also includes a handle connected to the guide plate that is movable with the guide plate between the locked and the unlocked position.

In a preferred embodiment, the neck includes a blocking portion extending therefrom and the handle includes an extension portion that extends outwardly therefrom. When the door assembly is pivoted from the open position to the closed position and the handle is in the locked position, the extension portion contacts the blocking portion, thereby preventing the door assembly from moving to the closed position. Preferably, the handle comprises a shaft portion that extends in a direction that is generally perpendicular to the first axis, and the extension portion is offset from the shaft portion. The blocking portion includes a channel defined therein that receives the extension portion when the door assembly is in the closed position and the handle is rotated to the locked position. In a preferred embodiment, the first lock ring segment includes a first guide rod extending inwardly therefrom that is received in and is translatable through a first receiver member that is connected to the door portion. In a preferred embodiment, the first lock ring segment includes a second guide rod extending inwardly therefrom that is received in and is translatable through a second receiver member that is connected to the door portion. Preferably, the first and second guide rods are position on opposite sides of the first lug assembly, and the first lug assembly defines an axis that extends through the first axis and the first and second guide rods each define an axis that does not extend through the first axis.

In a preferred embodiment, the inner surface has a convex shape. Preferably, the guide plate includes an outer diameter and an inner diameter, the first cam path includes a first end adjacent the outer diameter of the first cam path and a second end adjacent the inner diameter of the guide plate, and the first end corresponds to the locked position and the second end corresponds to the unlocked position. Preferably, the inner diameter of the neck includes a tapered section.

In accordance with another aspect of the present invention, there is provided a closure for a pressure vessel that includes a neck having a blocking portion extending therefrom, and a door assembly that pivots with respect to the neck between an open position and a closed position. The door assembly includes a door portion that includes an inner surface and an outer surface and is sized to be received in the central opening of the neck, and a handle that is rotatable between a locked and the unlocked position. The handle includes an extension portion that extends outwardly therefrom. When the door assembly is pivoted from the open position to the closed position and the handle is in the locked position, the extension portion contacts the blocking portion, such that the door assembly is prevented from moving to the closed position.

In a preferred embodiment, the blocking portion has an arcuate shape and the handle includes a handle member extending from the shaft portion in a direction that is generally parallel to the first axis. Preferably, the handle is operatively connected to at least one lock ring segment, and rotation of the handle causes the lock ring segment to move linearly.

One of the functions of the present invention is the use of multiple ring segments mounted to the door of the vessel. The rings are associated with guide rods such that the manual motion of the door handle from the unlocked position to the closed and locked position extends the ring segments into a groove in the vessel wall. The engagement of the ring segments in the groove of the vessel wall provides the necessary resistance to the thrust force placed on the door by the pressure of the vessel contents. A seal mounted on the vessel wall or door provides a means to prevent leaking of the vessel contents.

In a preferred embodiment, the invention also uses an extension on the handle coupled to the guide plate to prevent the door assembly from closing if the ring segments are in the locked position, thus limiting the potential for accidental operator error and damage to the components of the door assembly.

In a preferred embodiment, a further feature of the closure is the use of a single plate with elliptical guide grooves or cam paths. The guide plate has a plurality of grooves which maintain the ring segment guide lugs in the proper position for actuating the ring segments from the open to the closed (or unlocked and locked) positions and back. This guide plate pivots about the center axis of the door when the operator moves the handle. As the guide plate rotates through its approximately 90 degree motion, the elliptical shape of the cam paths impart an angular force of the ring segments which correspond to a radial motion of the ring segments thereby moving the rings in a radial inward and outward direction.

The ring segments move sufficiently inwardly to allow the door assembly to disengage from the neck of the vessel wall. A hinge mounted between the door assembly and the vessel external wall provides a pivot point for the closure to move from an open to a closed position with the ring segments positioned to the most inward radial position on the closure. When the door assembly is moved to the closed position, the operator can then move the door handle in a clockwise direction (or counter clockwise in another embodiment).

The action of moving the handle to the unlocked position (in the clockwise direction) provides two functions. The first function is the clearance of the handle extension to prevent accidental damage to the closure components, the second is the rotation of the guide plate.

In a preferred embodiment, a two part action is used to move the closure from the open access position to the closed and locked or locked position. First, the door assembly is moved to the closed position when the handle is held generally horizontal and moved about the hinge. If the operator were to attempt to move the door with the handle in a position other than horizontal, the handle extension would prevent the door from reaching the fully closed position as it would hit on the blocking portion. Once the door is fully closed, the handle can then be moved in a clockwise direction. This action engages the handle with the blocking portion and provides a radial force on the ring segments through the inclined plane created between the guide plate elliptical grooves or cam paths and the guide rods, which moves the ring segments to the locked position, and which provides the necessary resistance to the pressure vessel shear force on the ring segments. It should be understood that the handle extension and blocking portion can be rearranged such that the handle does not have to be horizontal when moving the door to the closed position. The handle can be positioned as desired around the vessel central opening.

It will be appreciated by those of ordinary skill in the art that another benefit of the invention is the seal arrangement between the door assembly and the vessel wall. The present invention provides a groove or series of grooves on either the vessel interior wall or the outside diameter of the door for the addition of a simple seal such as an O-ring or a multiple set of O-rings to seal the internal pressure of the vessel during operation. By using a small tapered section in the vessel opening, the door assembly can complete the opening and closing about the door hinge center point without the need for excess clearance. In other embodiments, this action can be provided by way of a four bar linkage system, straight guide rods mounted axially to the vessel, or any number of methods known to those skilled in the art. However, in a preferred embodiment, by placing an O-ring or a plurality of O-rings in the vessel opening on a tapered section, the arc created by the swing of the door assembly about the hinge is negligible. The mating of the taper of the vessel inside diameter to the door assembly outside diameter provides a low clearance area to place the vessel seal arrangement without the need for elaborate mechanisms.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
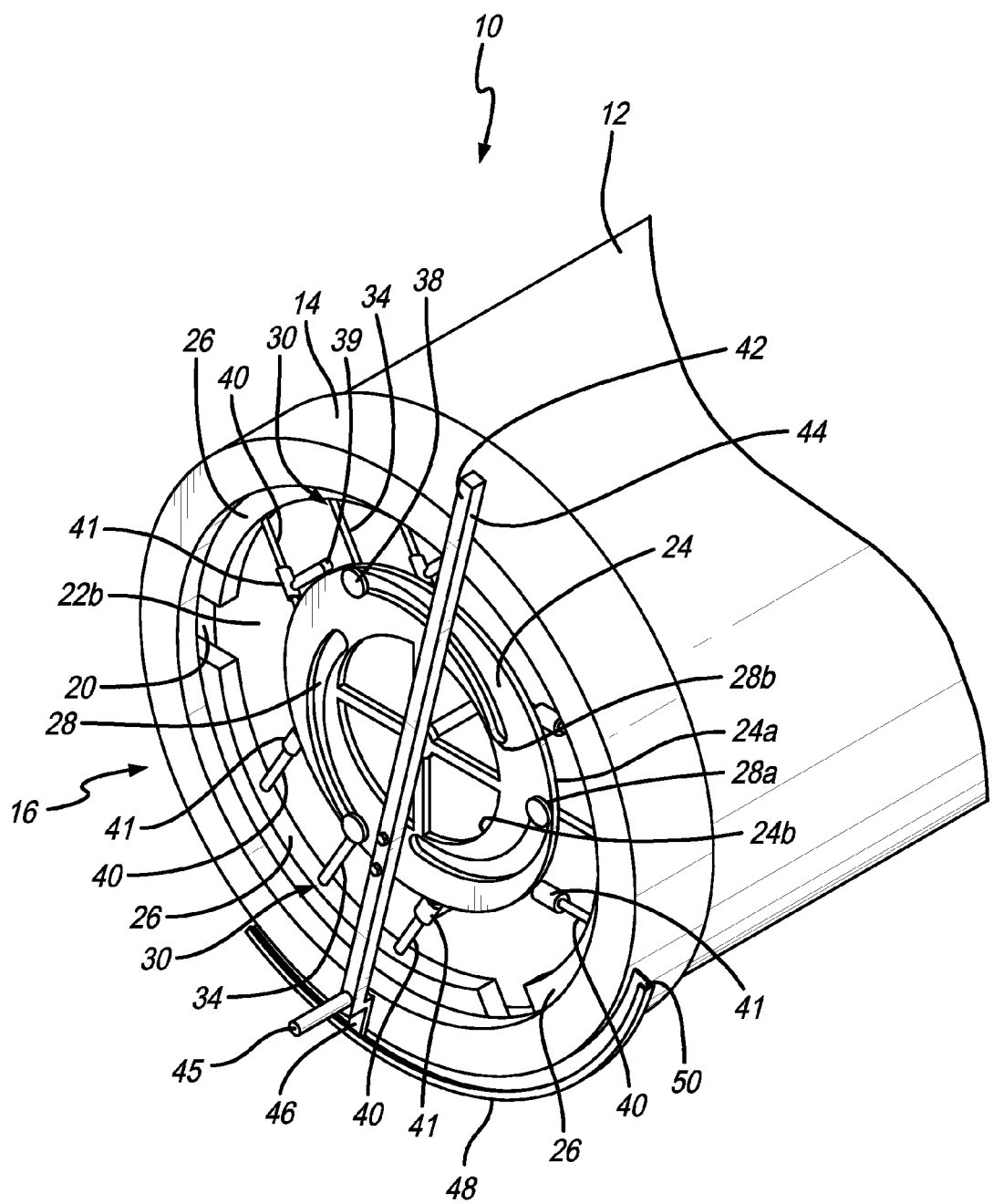
FIG. 1 is a perspective view of a pressure vessel closure with the door assembly in the closed position and with the hinge portions removed in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

FIGS. 1-6 show a closure 10 for a pressure vessel 12 in accordance with a preferred embodiment of the present invention. As shown, in a preferred embodiment, the closure 10 generally includes a neck 14 and a door assembly 16 that is pivotally connected to the neck 14 or other portion of the vessel 12. The neck 14 can either be unitary with the vessel 12 or can be secured or otherwise connected to the vessel 12 via any known method (e.g., welding, mechanical fasteners, adhesive, etc.). The neck 14 defines a central opening 18 that defines an inner diameter having a groove 20 defined therein. In another embodiment, the inner diameter can have a plurality of grooves defined therein.

The door assembly 16 pivots with respect to the neck 14 between an open position and a closed position. In a preferred embodiment, the door assembly 16 includes a door portion 22 that includes an inner surface 22a and an outer surface 22b and that is sized to be received in the central opening 18, a guide plate 24, and at least one and preferably a plurality of lock ring segments 26. The guide plate 24 is rotatably secured to the outer surface 22b of the door portion 22 such that the guide plate 24 can rotate relative to the door portion 22. Rotation of the guide plate 24 can be accomplished in a number of different ways. In an exemplary embodiment, one or the other of the guide plate 24 and the door portion 22 includes a bearing assembly 27. As discussed further below, the guide plate 24 is rotatable between a locked position and an unlocked position.

Figure 3:
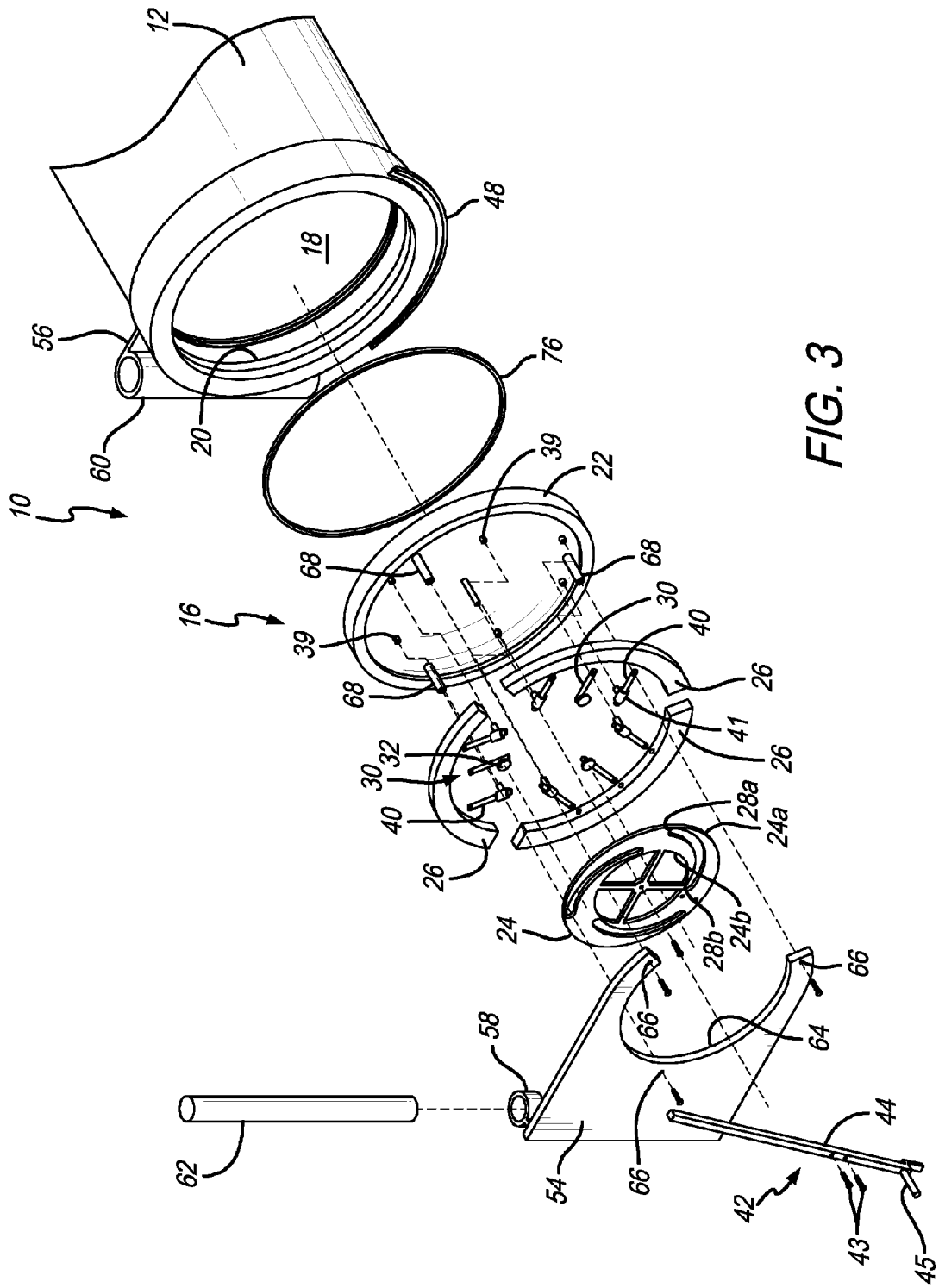
FIG. 3 is an exploded view of the pressure vessel closure of FIG. 1.

As shown in FIG. 3, in a preferred embodiment, the guide plate 24 includes at least one and preferably a plurality of cam paths 28 or grooves defined therein. The cam paths 28 have an arcuate shape having a first end 28a adjacent the outer diameter 24a of the guide plate 24 and a second end 28b adjacent the inner diameter 24b of the guide plate 24.

The lock ring segments 26 are positioned radially outwardly of the guide plate 24 and each include at least one lug assembly 30 that extends inwardly (radially) therefrom and that includes a cam member 32 on the distal end that is received in one of the cam paths 28. In a preferred embodiment the lug assemblies 30 each comprise a push rod 34 and the cam members 32 are bushings that are secured in an opening 34a in each push rod 34 by a nut 36 and bolt 38 arrangement. In another embodiment the cam member can be the shaft of the bolt 38. In another embodiment, the push rod and cam member can be unitary.

In operation, when the guide plate 24 is rotated, the cam members 32 ride along the cam paths 28 thus moving the lock ring segments 26 in a radial direction. In other words, rotational motion of the guide plate 24 is converted to radial (linear) motion of the lock ring segments 26 by the interaction of the cam paths 28 and cam members 32. Specifically, rotation of the guide plate 24 from the unlocked position to the locked position moves the lock ring segments 26 from a locked position to an unlocked position, and vice versa. In the locked position, the lock ring segments 26 are received in the groove 20 of the neck 14. When the cam members 32 are positioned at the first end 28a of the cam paths 28 (see FIG. 5B) they are in the locked position and when the cam members 32 are positioned at the second end 28b of the cam paths 28 (see FIG. 5B), they are in the unlocked position.

In a preferred embodiment, the door assembly 16 also includes at least one, and preferably a plurality of, guide rods 40 that keep the lock ring segments 26 moving in a radial direction when moving inwardly and outwardly between the locked and unlocked positions. The guide rods 40 are each received in an opening defined in a receiver member 41 that includes a neck that is attached to the door portion 22 (for example, the neck can be threaded into a female threaded member 39 attached to the door portion). One end of the guide rods 40 is attached to the inner radial surface of the lock ring segment 26. This can be accomplished by threading, welding or any other attachment method. In use, as the lock ring segment 26 moves inwardly or outwardly, the guide rods 40 move axially within the stationary receiver member 41. By having two guide rods 40, the lock ring segment 26 is prevented from twisting. In a preferred embodiment, the lug assembly is position such that it extends through the first axis A1 and the guide rods 40 extend parallel to the push rod 34, but do not extend through the first axis A1. In another embodiment, a flat plate with rollers on each side can be used to guide each ring segment.

Figure 6:
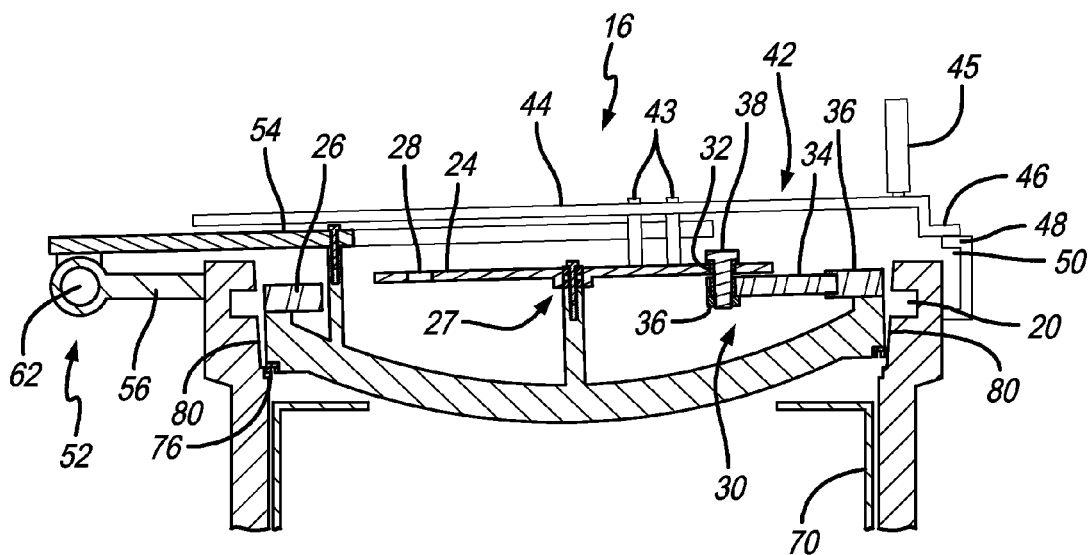
FIG. 6 is a top cross-sectional elevational view of the pressure vessel closure of FIG. 1 with the extension member of the handle contacting the blocking member, thus preventing the door assembly from moving to the closed position.
Figure 5A:
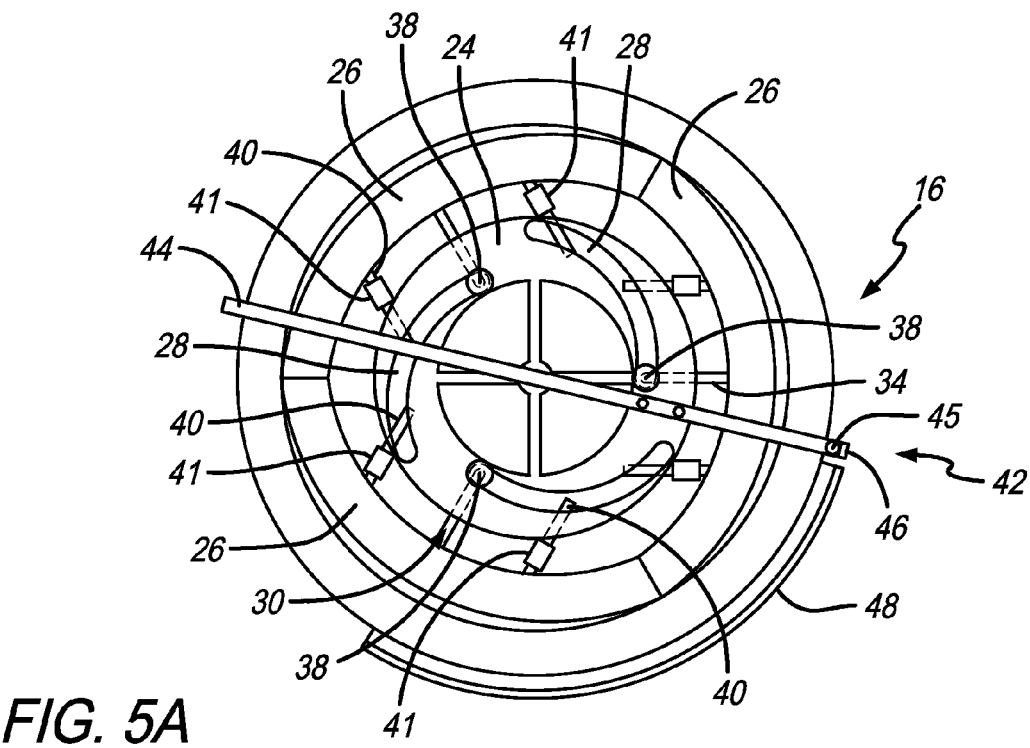
FIG. 5A is a front elevational view of the pressure vessel closure of FIG. 1 with the lock segments and guide ring in the open position and with the hinge portions removed.
Figure 5B:
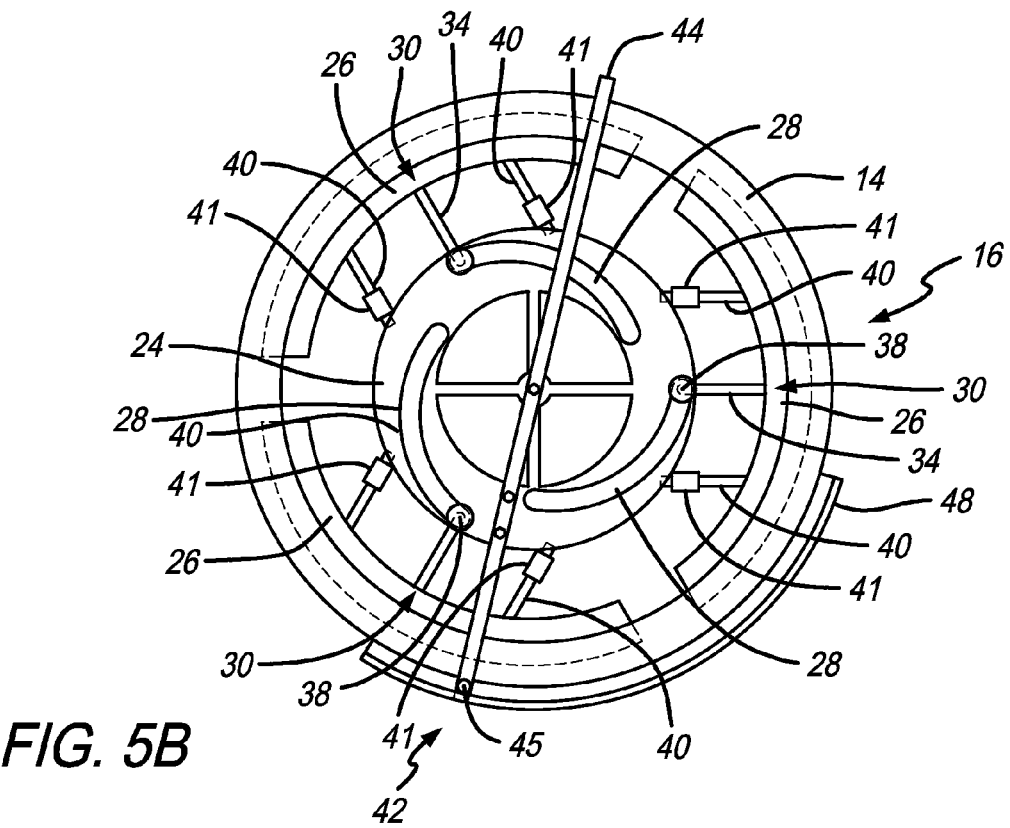
FIG. 5B is a front elevational view of the pressure vessel closure of FIG. 1 with the lock segments and guide ring in the closed position and with the hinge portions removed.

As shown in FIG. 1, the door assembly 16 also includes a handle 42 that is operatively associated with or connected to the guide plate 24 and is movable between a locked and unlocked position. The handle 42 can be connected to the guide plate 24 by any known method, e.g., by mechanical fasteners 43, welding, adhesive, etc. Any type of handle is within the scope of the present invention as long as it provides the ability to rotate the guide plate 24. In a preferred embodiment, the handle 42 includes a shaft portion 44 that extends in a direction that is generally perpendicular to the axis A1 defined by the guide plate 24, a handle member 45 extending from the shaft portion 44, and an extension portion 46 that interacts with a blocking portion 48 extending from the neck 14. As shown in FIGS. 1 and 5B, when the handle 42 is moved to the locked position (and the door assembly 16 is in the closed position), the extension portion 46 is received in a channel 50 defined by the blocking portion 48. However, as shown in FIG. 6, if the door assembly 16 is moved from the open position toward the closed position while the handle 42 is in the locked position, the extension portion 46 will contact the blocking portion 48, thereby preventing the door assembly 16 from reaching the closed position. This prevents the lock ring segments 26 from hitting the neck 14 and possibly damaging the lock ring segments 26, the lug assemblies 30 or any other components. In another embodiment, the handle can be circular or the handle can simply be a rod that extends outwardly from the guide plate 24.

Figure 2:
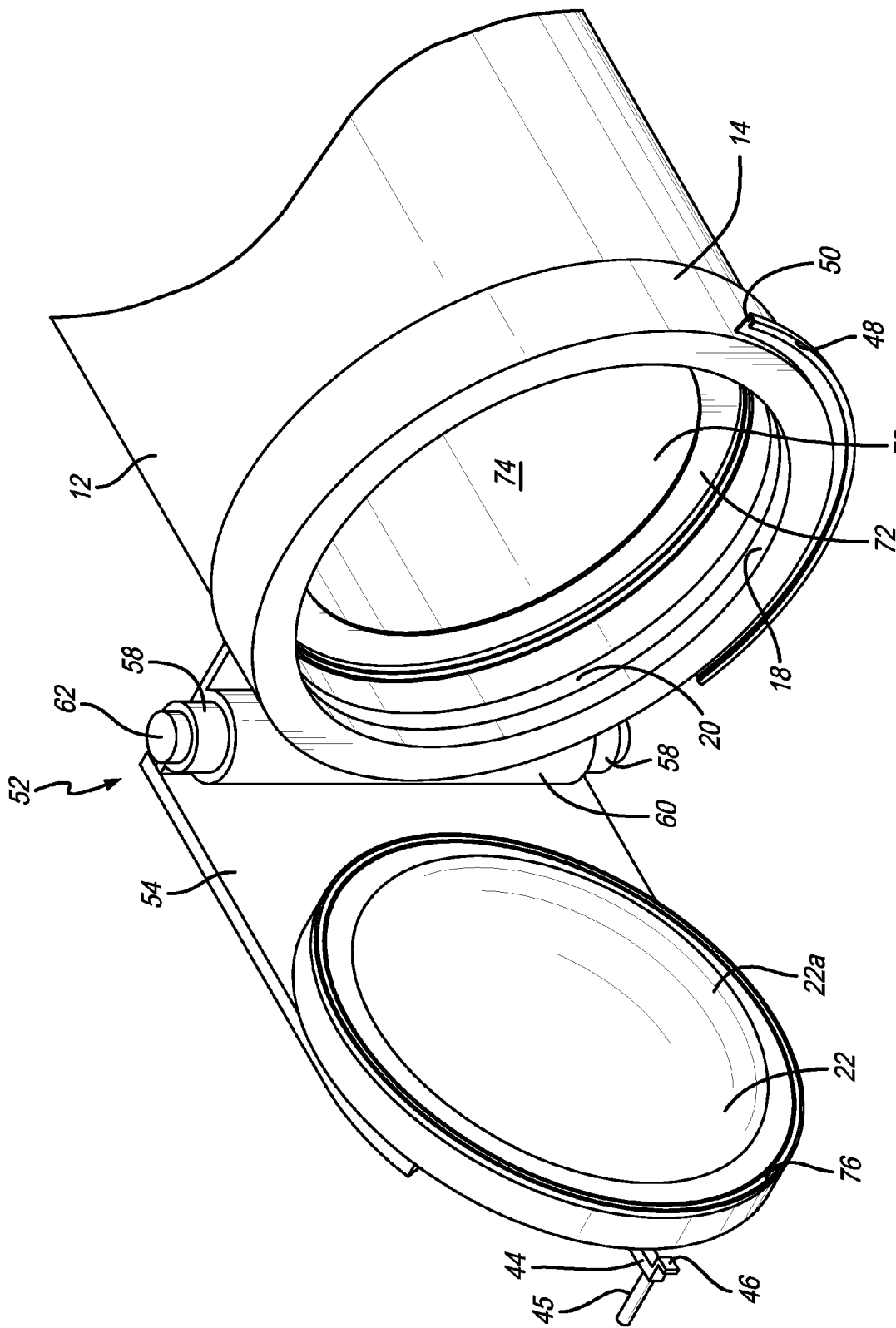
FIG. 2 is a perspective view of the pressure vessel closure of FIG. 1 with the door assembly in the open position.

As shown in FIGS. 2-3, in a preferred embodiment, the door assembly 16 is pivotal with respect to the vessel 12 by a hinge 52. Any type of hinge is within the scope of the present invention. In a preferred embodiment, the hinge 52 includes a hinge portion 54 that is attached to the door portion 22 and a hinge portion 56 that is attached to the vessel 12. The hinge portions 54 and 56 include complementary knuckles 58 and barrels 60 through which a hinge pin 62 extends. Preferably, hinge portion 54 includes a curved cut out 64 therein that provides clearance for some of the moving components of the door assembly 16 and includes openings 66 therein that provide connection to the door portion 22 via studs 68 or the like. Hinge portion 54 can be connected to door portion 22 by any known method, e.g., welding, mechanical fasteners, adhesives, etc.

Figure 4:
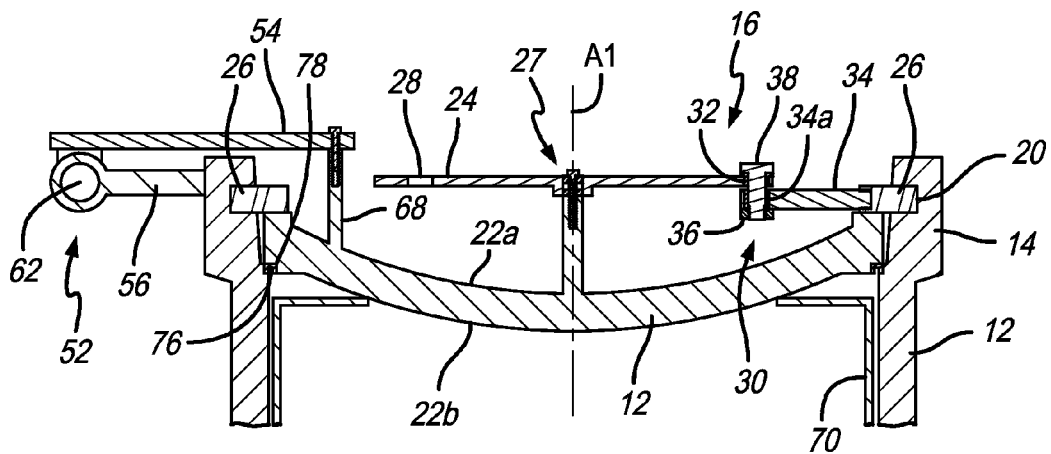
FIG. 4 is a cross-section of the pressure vessel closure of FIG. 1 with the lock segments in the locked position.

As shown in FIGS. 2 and 4, in a preferred embodiment, the inner surface 22a of the door portion 22 has a convex shape. Preferably, the outer surface 22b has a concave shape, which defines a space that at least partially receives the guide plate 24 and related components. The convex inner surface 22a abuts a basket 70 inside the vessel. The basket 70 includes an outer flange 72 that defines an opening 74 into which the convex inner surface 22a extends.

In a preferred embodiment, one or both of the neck 14 and the door portion 22 includes a seal 76 to prevent leaking of the vessel contents. As shown in FIG. 4, in a preferred embodiment, the seal 76 is mounted on the door portion 22. The present invention provides a groove 78 or series of grooves on the outside diameter of the door portion 22 for mounting of the seal 76 (such as an O-ring or a multiple set of O-rings) to seal the internal pressure of the vessel during operation. In a preferred embodiment, the neck 14 includes a tapered section 80 in the vessel opening, which allows the door assembly 16 to complete the opening and closing about the door hinge 52 center point without the need for excess clearance. It will be appreciated that by placing the seal 76 in the opening 18 on the tapered section 80, the arc created by the swing of the door assembly 16 about the hinge is negligible. The mating of the taper of the vessel inside diameter to the door assembly outside diameter provides a low clearance area to place the vessel seal arrangement.

The lock ring segments 26 are shown in the closed position in FIG. 5B. As shown, the guide plate 24 and handle 42 are positioned fully clockwise with the handle 42 held in the groove of the blocking portion 48. FIG. 5A shows the lock ring segments 26 in the open position. As shown, the guide plate 24 and handle 42 are in the full counterclockwise position. The handle 42 is beyond the blocking portion 48, which allows the operator to swing the door assembly to the open position providing access to the interior of the pressure vessel 12.

In use, when the door assembly 16 is in the closed position, as shown in FIG. 5B, to unlock and open the door assembly 16, the handle 42 is moved from the locked position (FIG. 5B), where the extension member 46 is received in the channel 50 of the blocking portion 48, to the unlocked position (FIG. 5A), where the extension member 46 is outside of the channel 50 of the blocking portion 48. This motion rotates the guide plate 24 from the locked position (FIG. 5B) to the unlocked position (FIG. 5A). This motion causes the cam member 32 to ride along the cam paths 28 from the locked position (FIG. 5B) to the unlocked position (FIG. 5A). This motion causes the push rods 34 to pull the lock ring segments 26 inwardly from the locked position (FIG. 5B) to the unlocked position (FIG. 5A) and out of the groove 20. While this happens, the guide rods 40 translate within the receiver members 41 to guide the lock ring segments 41 in a radial direction. At this point, the door assembly 16 can be pivoted from the closed position (FIG. 5A) to the open position (FIG. 2).

In use, when the door assembly 16 is in the open position, as shown in FIG. 2, to close and lock the door assembly 16, the operator pivots the door from the open position to the closed position (FIG. 5A). Next, the handle 42 is moved from the unlocked position (FIG. 5A), where the extension member 46 is outside of the channel 50 of the blocking portion 48, to the locked position (FIG. 5B), where the extension member 46 is received in the channel 50 of the blocking portion 48. This motion rotates the guide plate 24 from the unlocked position (FIG. 5A) to the locked position (FIG. 5B). This motion causes the cam member 32 to ride along the cam paths 28 from the unlocked position (FIG. 5A) to the locked position (FIG. 5B). This motion causes the push rods 34 to push the lock ring segments 26 outwardly from the unlocked position (FIG. 5A) to the locked position (FIG. 5B) and in the groove 20. While this happens, the guide rods 40 translate within the receiver members 41 to guide the lock ring segments 41 in a radial direction.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A closure for a pressure vessel, the closure comprising:
    a neck that is adapted to be secured to the pressure vessel, wherein the neck defines a central opening that defines an inner diameter, and wherein a groove is defined in the inner diameter,
    a door assembly that pivots with respect to the neck between an open position and a closed position, wherein the door assembly includes
        a door portion that includes an inner surface and an outer surface, wherein the door portion is sized to be received in the central opening of the neck,
        a guide plate that is co-axial with and connected to the door portion, wherein the guide plate is rotatable between a locked position and an unlocked position, wherein the guide plate includes at least a first cam path defined therein, wherein the guide plate defines a rotation plane and a first axis about which the guide plate rotates, and wherein the cam path is defined in the rotation plane,
        a first lock ring segment positioned radially outwardly of the guide plate and including a first lug assembly that extends inwardly and has a cam member that is received in the first cam path, wherein rotation of the guide plate from the unlocked position to the locked position moves the first lock ring segment from a locked position to an unlocked position, and wherein in the locked position, the first lock ring segment is received in the groove of the neck, wherein a first receiver member that includes an opening defined therethrough is connected to the door portion, wherein the first lock ring segment includes a first guide rod extending radially inwardly therefrom, wherein the first guide rod is received in and is translatable in a substantially linear direction through the opening in the first receiver member, and
        a handle connected to the guide plate that is movable with the guide plate between the locked and the unlocked position.

2. The closure of claim 1 wherein the neck includes a blocking portion extending therefrom, wherein the blocking portion includes a channel defined therein that is located axially outwardly from the front surface of the neck, wherein the handle includes an extension portion that extends outwardly therefrom, wherein the channel in the blocking portion has a curvature with a constant radius that is coaxial with the first axis, wherein when the door assembly is pivoted from the open position to the closed position and the handle is in the locked position, the extension portion contacts the blocking portion, such that the door assembly is prevented from moving to the closed position.

3. The closure of claim 2 wherein the handle comprises a shaft portion that extends in a direction that is generally perpendicular to the first axis, wherein the extension portion is offset from the shaft portion in a direction that is generally parallel to the first axis, wherein the blocking portion includes a channel defined therein that receives the extension portion when the door assembly is in the closed position and the handle is rotated to the locked position.

4. The closure of claim 1 wherein the first lock ring segment includes a second guide rod extending inwardly therefrom that is received in and is translatable through a second receiver member that is connected to the door portion.

5. The closure of claim 4 wherein the first and second guide rods are position on opposite sides of the first lug assembly, and wherein the first lug assembly defines an axis that extends through the first axis and the first and second guide rods each define an axis that does not extend through the first axis.

6. The closure of claim 1 wherein the inner surface has a convex shape.

7. The closure of claim 1 wherein the guide plate includes an outer diameter and an inner diameter, wherein the first cam path includes a first end adjacent the outer diameter of the first cam path and a second end adjacent the inner diameter of the guide plate, and wherein the first end corresponds to the locked position and the second end corresponds to the unlocked position.

8. The closure of claim 1 wherein the inner diameter of the neck includes a tapered section.

9. The closure of claim 1 wherein the guide plate is movable with the door portion between the open and the closed position.

10. The closure of claim 9 wherein the guide plate is mounted on the outer surface of the door portion.

11. A closure for a pressure vessel, the closure comprising:
    a neck that is adapted to be secured to the pressure vessel, wherein the neck includes a front surface and defines a central opening that defines an inner diameter, and wherein a groove is defined in the inner diameter, wherein the neck includes a blocking portion having an inner surface and an outer surface extending therefrom, wherein the blocking portion includes a channel defined therein that is located axially outwardly from the front surface of the neck and has a curvature with a constant radius that is coaxial with the first axis, wherein the outer surface of the blocking portion is positioned axially outwardly from the front surface of the neck and the groove is positioned axially inwardly from the front surface of the neck, and wherein the blocking portion has an arcuate shape, a door assembly that pivots with respect to the neck between an open position and a closed position, wherein the door assembly includes a door portion that includes an inner surface and an outer surface, wherein the door portion is sized to be received in the central opening of the neck, and a handle that is rotatable between a locked and the unlocked position, wherein the handle is movable with the door portion between the open and the closed position, wherein the handle includes an extension portion that extends outwardly therefrom, wherein when the door assembly is pivoted from the open position to the closed position and the handle is in the locked position, the extension portion contacts the outer surface of the blocking portion, such that the door assembly is prevented from moving to the closed position.

12. The closure of claim 11 wherein the handle comprises a shaft portion that extends in a direction that is generally perpendicular to a first axis defined by the rotation of the handle, wherein the extension portion is offset from the shaft portion in a direction that is generally parallel to the first axis, wherein the blocking portion includes a channel defined therein that receives the extension portion when the door assembly is in the closed position and the handle is in the locked position.

13. The closure of claim 12 wherein the handle includes a handle member extending from the shaft portion in a direction that is generally parallel to the first axis.

14. The closure of claim 12 wherein the handle is operatively connected to at least one lock ring segment, such that rotation of the handle causes the lock ring segment to move linearly.

15. The closure of claim 14 wherein the lock ring segment has an arcuate shape.

16. The closure of claim 11 wherein the handle rotates about a first axis, and wherein the handle moves in a plane that is generally perpendicular to the first axis.

17. The closure of claim 16 wherein the neck defines a second axis, wherein when the door assembly is in the closed position the second axis is co-axial with the first axis, and wherein when the extension portion contacts the outside surface of the blocking portion the second axis is not co-axial with the first axis.

\* \* \* \* \*